(12) United States Patent
Martin et al.

(10) Patent No.: US 9,273,153 B2
(45) Date of Patent: Mar. 1, 2016

(54) PROCESS FOR PREPARING GUAYULE NATURAL RUBBER

(71) Applicant: Yulex Corporation, Chandler, AZ (US)

(72) Inventors: Jeff Martin, Solana Beach, CA (US);
James Mitchell, Ahwatukee, AZ (US);
Ray McCoy, Chandler, AZ (US);
Sebastian S. Plamthottam, Upland, CA (US)

(73) Assignee: Yulex Corporation, Chandler, AZ (US)

( * ) Notice: Subject to any disclaimer, the term of this patent is extended or adjusted under 35 U.S.C. 154(b) by 9 days.

(21) Appl. No.: 14/169,062

(22) Filed: Jan. 30, 2014

(65) Prior Publication Data

US 2014/0213696 A1    Jul. 31, 2014

Related U.S. Application Data

(60) Provisional application No. 61/758,684, filed on Jan. 30, 2013.

(51) Int. Cl.
*C08C 1/15* (2006.01)

(52) U.S. Cl.
CPC .......................... *C08C 1/15* (2013.01)

(58) Field of Classification Search
CPC .................................. C08L 3/11; C08C 1/15
USPC ................... 523/332, 352; 524/571
See application file for complete search history.

(56) References Cited

U.S. PATENT DOCUMENTS

| 4,526,959 | A | 7/1985 | Kay et al. |
| 5,698,666 | A | 12/1997 | Burroway et al. |
| 2004/0048970 | A1 | 3/2004 | Hagiwara et al. |

FOREIGN PATENT DOCUMENTS

| JP | 62-000502 A | 1/1987 |
| JP | 2008-088447 A | 4/2008 |

OTHER PUBLICATIONS

KIPO Search Report and Written Opinion dated May 19, 2014 for corresponding application No. PCT/US2014/013956.

*Primary Examiner* — Edward Cain
(74) *Attorney, Agent, or Firm* — Greenberg Traurig, LLP

(57) ABSTRACT

Embodiments of the invention provide a method of processing natural rubber latex using an extruder including a plurality of process zones by processing coagulant with latex to produce a coagulum and serum. In some embodiments, the coagulant can include an acid, a metal salt, or a mixture of both. Some embodiments can include a coagulum wash stage, and a deresination step. In some embodiments, the extruder can be operated to move coagulum through the extruder to remove at least some fraction of water to form a substantially dewatered coagulum, and a drying step to form a dried coagulum. In some embodiments, a stabilizer such as an antioxidant can be introduced into the extruder, and processed to remain in some fraction in the dried coagulum. Some alternative embodiments include a latex processing method of providing a flow of coagulant, and combining latex with the flowing using an emulsion dispensing bar.

20 Claims, 10 Drawing Sheets

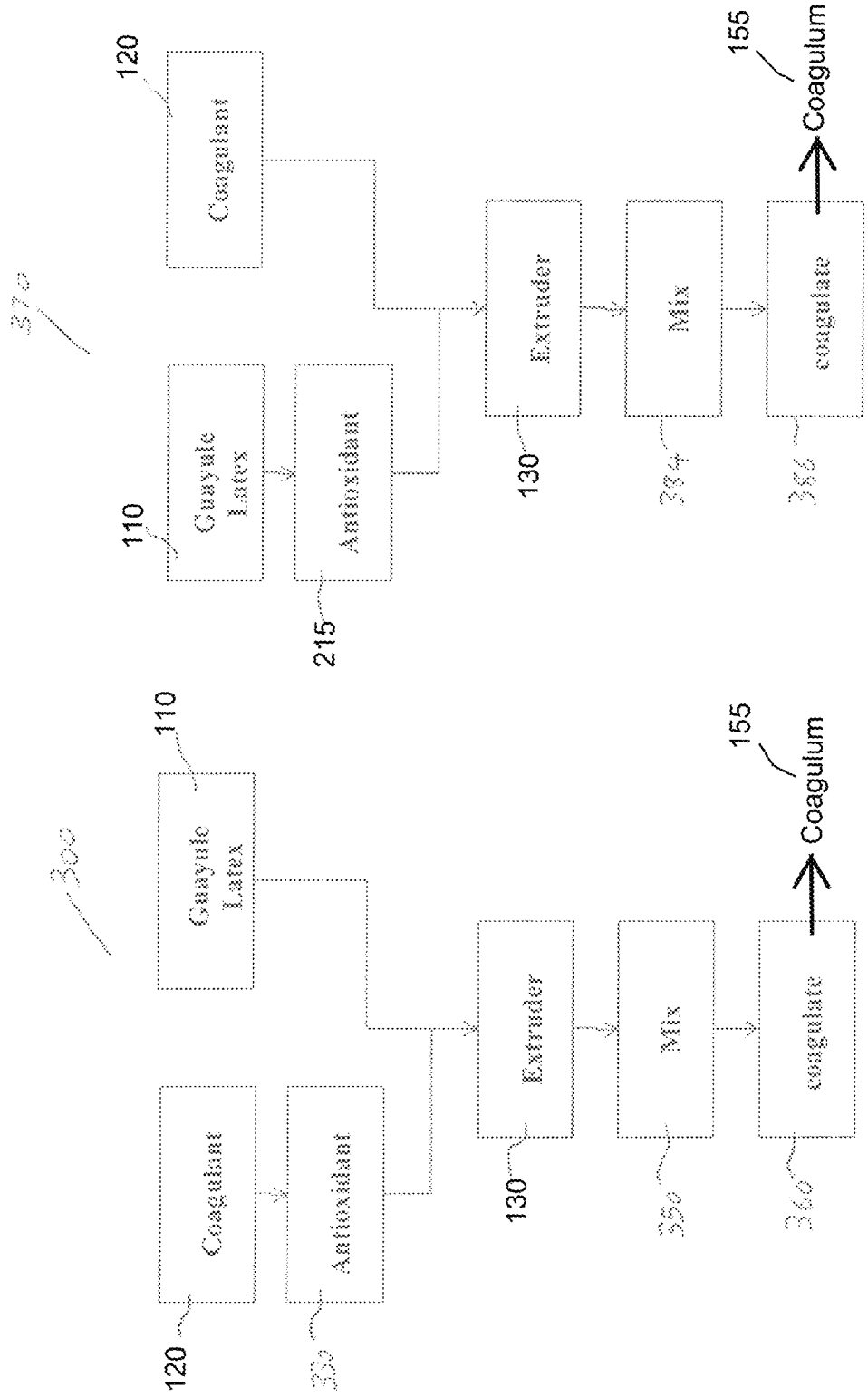

| | Typical Guayule rubber properties |
|---|---|
| Mooney Viscosity (ML $_{1-4}$) | 65-95 |
| Dirt content (%) | 0.2 |
| Ash (%) | 0.3 |
| Volatile matter (%) | 0.8 |
| Nitrogen (%) | 0.4 |

920

915a — Mooney Viscosity (ML $_{1-4}$)
915b — Dirt content (%)
915c — Ash (%)
915d — Volatile matter (%)
915e — Nitrogen (%)

| | Antioxidant Type | Level | Mooney Retention Index (MRI) after heat aging (%) |
|---|---|---|---|
| 1 | 2,5,-Di(tert-amyl)Hydroquinone (CAS# 79-74-3) | 1.50% | 48 |
| 2 | Hindered Phenol Type Antioxidant | 0.75% | 29 |
| 3 | 50/50 Blend of (1) and (2) | 1.50% | 88 |
| 4 | Blend of sterically hindered phenol and thioester | 1.50% | 44 |
| 5 | 50/50 Blend of (1) and (4) | 1.50% | 82 |
| 6 | N,N'-Di-beta-napthyl-p-phenylenediamine | 1.50% | 74 |
| 7 | 50/50 Blend of Octadecyl-3-(3,5-di-tert.butyl-4-hydroxyphenyl)-propionate and (1) | 1.50% | 88 |

970, 973, 976, 979, 982, 985, 988

PROCESS FOR PREPARING GUAYULE NATURAL RUBBER

CROSS REFERENCE TO RELATED APPLICATIONS

This application claims the benefit of filing date of U.S. Provisional Application Ser. No. 61/758,684 titled "PROCESS FOR PREPARING GUAYULE NATURAL RUBBER" filed on Jan. 30, 2013, the specification of which is incorporated by reference herein in its entirety.

BACKGROUND

Natural Rubber is a polymer of isoprene (2-methyl-1,3-butadiene), and is one of the world's best known natural polymers. Plant-derived natural rubber, is predominately comprised of cis-1,4 polyisoprene which forms a milky suspension or dispersion in water (latex), and is found in the sap of a variety of plant species such as guayule (*Parthenium argentatum*), gopher plant (*Euphorbia lathyris*), mariola (*Parthenium incanum*), rabbitbrush (*Chrysothamnus nauseosus*), milkweeds (*Asclepias syriaca, speciosa, subulata*, et al), goldenrods (*Solidago altissima, graminifolia, rigida*, et al), pale Indian plantain (*Cacalia atripilcifolia*), Russian dandelion (*Taraxacum Kok-Saghyz*), mountain mint (*pycnanthemum incanum*), American germander (*Teucreum canadense*) and tall bell flower (*Campanula Americana*), amongst others.

Some plant species, such as guayule, thrive in arid and semi-arid regions such as those present in the southwestern deserts of the United States. This potentially provides an opportunity to greatly expand domestic production of natural rubber using land that would otherwise lie dormant. Natural rubber can be extracted from plants, including guayule, in the form of a latex using waterborne processes such as those detailed in U.S. Pat. No. 7,923,039 (herein the entire contents of which are incorporated by reference).

In general, the rubber latex that is derived from plants contains a few percent of other materials (proteins, fatty acids, resins and inorganic materials). In order to meet certain standards (such as those developed and administered by ASTM International), as well as market requirements and consumer preferences, it is desirable to convert the plant-derived latex into a block rubber product that is essentially free of resin and other contaminants. The conventional processes used for making Hevea block rubber, such as coagulation with dilute acids such as formic and acetic acid, tend not to completely coagulate the latex. In addition, the rubber tends to thermally and oxidatively degrade rapidly during the drying processes forming chemical groups which can create color centers in the polymer. Natural rubber that has been extracted and processed into film or block rubber also tends to degrade during storage. If present in sufficient concentration, these color centers can substantially discolor the rubber. Some end-user applications, such as those requiring use in medical, and health related applications, require a natural rubber product to meet certain chemical and physical parameters. This includes having a visual appearance requiring the material to be essentially free of color centers. In some applications, it is desirable to extract natural rubber from rubber latex that contains some proportion of antioxidant or other stabilizer product. More preferably, the antioxidant or other stabilizer should not itself substantially discolor the natural rubber product to any significant degree. Furthermore, as latex generally contains a high percentage of water, using processes designed to produce block and film rubber tends to take extended process times, or require inefficient use of energy to produce a dried product. Furthermore, direct conversion of latex to a film or block rubber product inherently produces a material with undesirable concentrations of resin and other contaminants. In certain applications where the guayule resin is considered detrimental to user-performance, it is often desirable to remove substantially all of the resins, or some of the resins. Therefore it is often desirable to remove substantially all the acetone extractable components in the rubber, other than any added stabilizer, including, without limitation, antioxidants.

SUMMARY

Some embodiments of the invention provide a method of processing natural rubber latex, such as guayule latex that contains a naturally resident resin contaminant. In some embodiments, at least one coagulant is mixed with latex in an extruder. In some embodiments, combining latex with coagulant within a plurality of process zones produces a primary phase comprising a coagulated latex (herein referred to as a "coagulum"), and a secondary phase containing latex resin and other contaminants, (herein referred to as "serum"). In some embodiments the coagulant comprises an acid, a metal salt, or a mixture of both.

In some embodiments, latex can be processed in an extruder that includes numerous process zones positioned in series, or in parallel, or both. For example, some embodiments can include at least one zone that is able to mix and knead the latex, and at least one zone that can coagulate the latex to form a mixture of coagulum and serum.

Some embodiments can include a coagulum wash stage, where water can be introduced into a process zone of the extruder, and where mixing and kneading of the coagulum within the operating the extruder, followed by removal of the water produces a substantially washed coagulum.

Some embodiments provide at least one solvent capable of at least partially dissolving at least some fraction of the coagulum. In some embodiments, a solvent can be introduced into at least one of the process zones of the extruder. In some embodiments, the solvent can be capable of contacting the coagulum, and the extruder can be operated so that some fraction of the coagulum can be substantially converted to deresinated coagulum. In some embodiments, the solvent can be a ketone, an alcohol, or mixtures thereof. In some embodiments, the solvent can be extracted from the extruder and recycled.

In some embodiments, the extruder can be operated to move a coagulum through the extruder to remove at least some fraction of water to form a substantially dewatered coagulum. In some further embodiments, the extruder can be operated to move the coagulum to create a substantially dried coagulum.

In some embodiments, the extruder can be operated to remove the serum from the mixture of coagulum and serum prior to performing the wash step, and in some further embodiments, the solvent can be removed from the extruder and recycled.

Some embodiments provide a method that includes combining guayule latex with coagulant in an extruder, forming coagulum in the extruder, dewatering the coagulum in the extruder, and drying the coagulum, where each step takes place substantially simultaneously at times, and in some embodiments, each step takes place continuously.

Some embodiments further include mixing at least some fraction of the at least one solvent with at least some fraction of the guayule latex and at least some fraction of the at least one coagulant prior to performing the wash step. In some embodiments, the extruder is operated to remove the serum from the mixture of coagulum and serum prior to performing the wash step. In some embodiments, one or more solvents are extracted from the serum, and in some embodiments, one or more of the solvents can be recycled.

In some embodiments, the dried coagulum can include a stabilizer. In some embodiments, a stabilizer such as an antioxidant can be added to the latex in order to remain in some fraction in the dried coagulum after coagulation. In other embodiments, the stabilizer can be added to the coagulant prior to addition to the latex. In some further embodiments, a stabilizer can be introduced into a zone of the extruder, and mixed with the coagulant, or the latex, or both.

In some embodiments, the coagulant comprises an acid such as citric acid, formic acid, acetic acid, or sulfuric acid. The coagulant can also further comprise a metal salt. In some embodiments, the at least one solvent can comprise a ketone or an alcohol, and can comprise acetone, methyl ethyl ketone, methyl isobutyl ketone, or mixtures thereof, or methanol, ethanol, isopropyl alcohol, an ethoxylated alcohol, or a mixture thereof.

In some embodiments, the at least one antioxidant comprises a substantially non-staining antioxidant. In some embodiments, the at least one antioxidant is at least one of a sterically hindered phenol, a hydroquinone derivative, a paraphenylene diamine derivative, a mixture of a sterically hindered phenol and a hydroquinone derivative. In some further embodiments, the antioxidant comprises at least one antioxidant selected from a group consisting of a mixture of butylated reaction product of p-cresol and dicyclopentadience (CAS. Reg. No. 68610-51-5) and an aqueous mixture of 2,5-Di(Tert-Amyl)Hydroquinone (CAS. Reg. No. 79-74-3) and Sodium Salts of Polymerized Alkylnaphthalenesulfonic Acid (CAS. Reg. No. 9084-06-4/36290-04-7), Octadecyl 3,5-Di(tert)-butyl-4-hydroxyhydrocinnamate) (CAS. Reg. No. 2082-79-3). a synergistic blend of polymeric hindered phenol and thioester (dilaurylthiodipropionate) (CAS. Reg. No. 68610-51-5 and CAS. No. 123-28-4, N,N'-di-beta-naphthyl-p-phenylenediamine, 55% casein free dispersion (CAS. No. 93-46-9), and a 50% active aqueous dispersion of polymerized 1,2 Dihydro-2,2,4-Trimethylquinoline (CAS. No. 26780-96-1).

In some embodiments, the dried coagulum extracted from the extruder shows a Mooney retention index of at least about 85% after heat aging at 143° C. for 30 minutes. In other embodiments, the dried coagulum extracted from the extruder shows a Mooney retention index between at least about 60% and about 85% after heat aging at 143° C. for 30 minutes.

Some embodiments include a latex processing method comprising providing latex comprising a resin contaminant, providing a flow of coagulant, and providing an emulsion dispensing bar including at least one inlet and at least one outlet, the emulsion dispensing bar configured and arranged to accept a flow of latex into the inlet and to eject latex from the at least one outlet. The latex processing method can include combining at least some fraction of the guayule latex with at least some fraction of the at least one coagulant by moving latex into the emulsion dispensing bar and ejecting latex from the at least one outlet into the flow of coagulant. The method can also comprise the flow of coagulant configured and arranged to at least partially coagulate the guayule latex to form a mixture of coagulum and a serum. Further, the method can also comprise washing the coagulum using a wash step, dewatering the coagulum by removing at least some fraction of water to form coagulum crumb, increasing a surface to volume ratio of the coagulum crumb, and moving at least some fraction of the coagulum crumb into a drying zone to substantially dry the coagulum crumb.

Some embodiments of the invention include a guayule solid rubber made according to a process of providing a guayule plant derived latex, coagulating the latex using a coagulating medium to form a coagulum, and drying the coagulum to a solid rubber containing an aging stabilizer, where the solid rubber meets or exceeds minimum requirements in testing in accordance with the requirements of ASTM standard D2227-96 (Reapproved 2007). Some other embodiments of the invention include the guayule solid rubber made according to the process where the guayule solid rubber meets or exceeds a technical grade 10 in accordance with the standard specification for natural Rubber (NR) Technical Grades of ASTM D2227-96 (Reapproved 2007).

In some embodiments, the guayule solid rubber shows a Mooney retention index of at least about 85% after heat aging at 143° C. for 30 minutes in a forced air circulating oven, and in some further embodiments, the Mooney retention index can be between at least about 60% to about 85% after heat aging at 143° C. for 30 minutes in a forced air circulating oven. Some embodiments include the guayule solid rubber with acetone extractable levels below about 10 wt. % or below about 5 wt. %.

Some embodiments of the invention include a guayule solid rubber made according to a process of providing a guayule plant derived rubber latex, coagulating the latex using a coagulating medium to form a coagulum, and washing the coagulum using acetone to remove substantially all acetone soluble components. The process can include adding at least one antioxidant, and forming a solid rubber containing the at least one antioxidant by drying the coagulum where the solid rubber meets or exceeds a technical grade 20 in accordance with the standard specification for natural Rubber (NR) Technical Grades of ASTM D2227-96 (Reapproved 2007).

DESCRIPTION OF THE DRAWINGS

FIG. 3A shows a flowchart illustrating a method of processing guayule latex according to one embodiment of the invention.

FIG. 3B shows a flowchart illustrating a method of processing guayule latex according to one embodiment of the invention.

FIG. 7A shows a table of typical Guayule rubber properties according to one embodiment of the invention FIG. 7B shows data for the Mooney retention index after aging for Guayule rubber containing antioxidants.

DETAILED DESCRIPTION

Figure 1A:
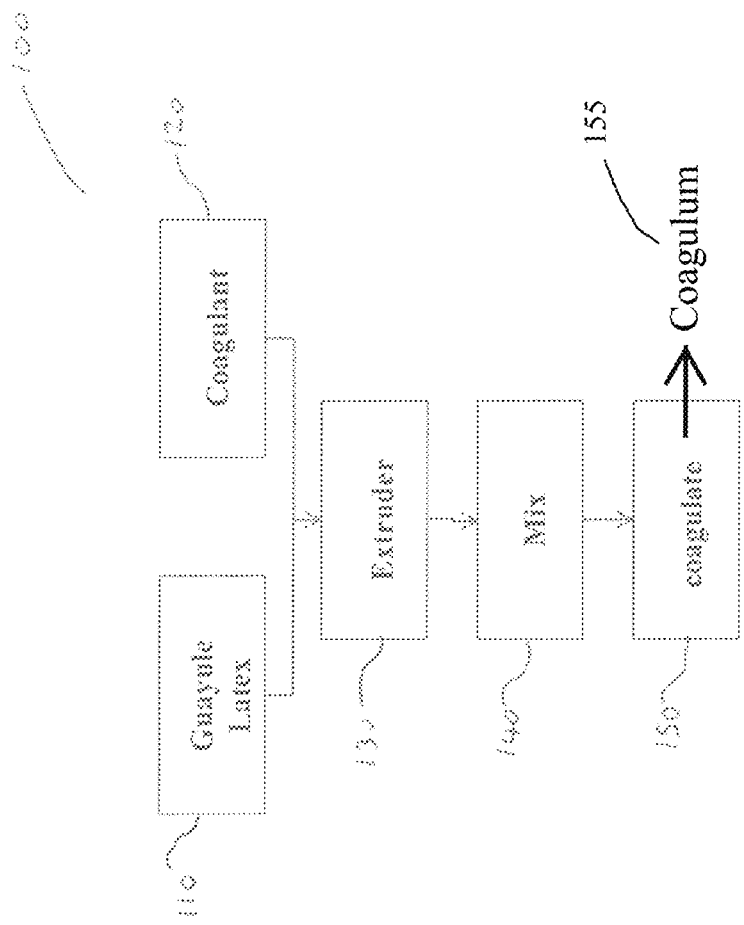
FIG. 1A shows a flowchart illustrating a method of processing guayule latex according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the invention.

Figure 1B:
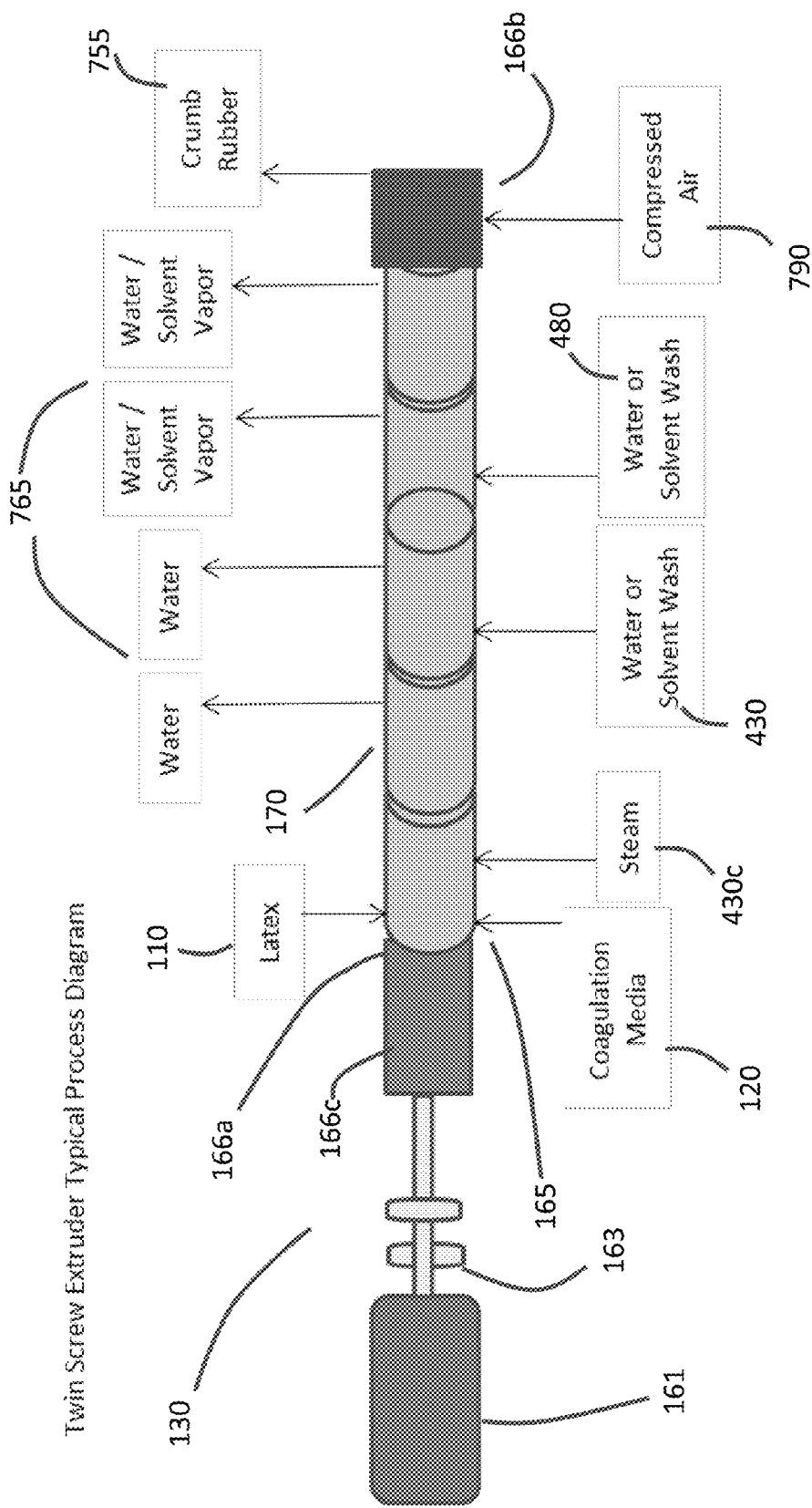
FIG. 1B illustrates an extruder with a depiction of associated processes according to one embodiment of the invention.

Some embodiments of the invention can include the use of an extruder to process guayule latex in one or more stages. For example, FIG. 1A shows a flowchart 100 illustrating a method of processing guayule latex 110 according to one embodiment of the invention. As shown, guayule derived latex 110 can be introduced into an extruder 130 along with a coagulant 120 in order to induce the process of coagulation 150. In a typical extruder, material enters an extruder barrel from a feed hopper where it comes in contact with one or more rotating screws. For example, FIG. 1B illustrates an extruder 130 with a depiction of associated processes according to one embodiment of the invention. As shown, in some embodiments, the extruder 130 can comprise a drive system 161 coupled to one or more rotating screws 163 (in this instance two screws). The screws 163 extend through an extruder barrel 165 comprising a first end 166a where latex 110 and coagulant 120 can enter the extruder 130. The barrel 165 can comprise a series of zones 170 through which material (i.e., latex 110, coagulant 120, and any by-products) can be moved using the screws 163. In some embodiments, water and/or solvents 430 can be fed into one or more of the zones 170 at various stages of the extrusion process. Further, in some embodiments, water in the form of steam 430a can be injected into one or more of the zones 170. As described in more detail below, in some embodiments, the water and/or solvents 430 can be extracted from the extruder 130, and in some embodiments, the water and/or solvents 430 can be recycled and reused in the extruder 130. In some embodiments, crumb rubber 755 can exit the second end 166b of the extruder 130, where it can be dried (e.g., using compressed air 790 or other conventional drying procedures).

Figure 5:
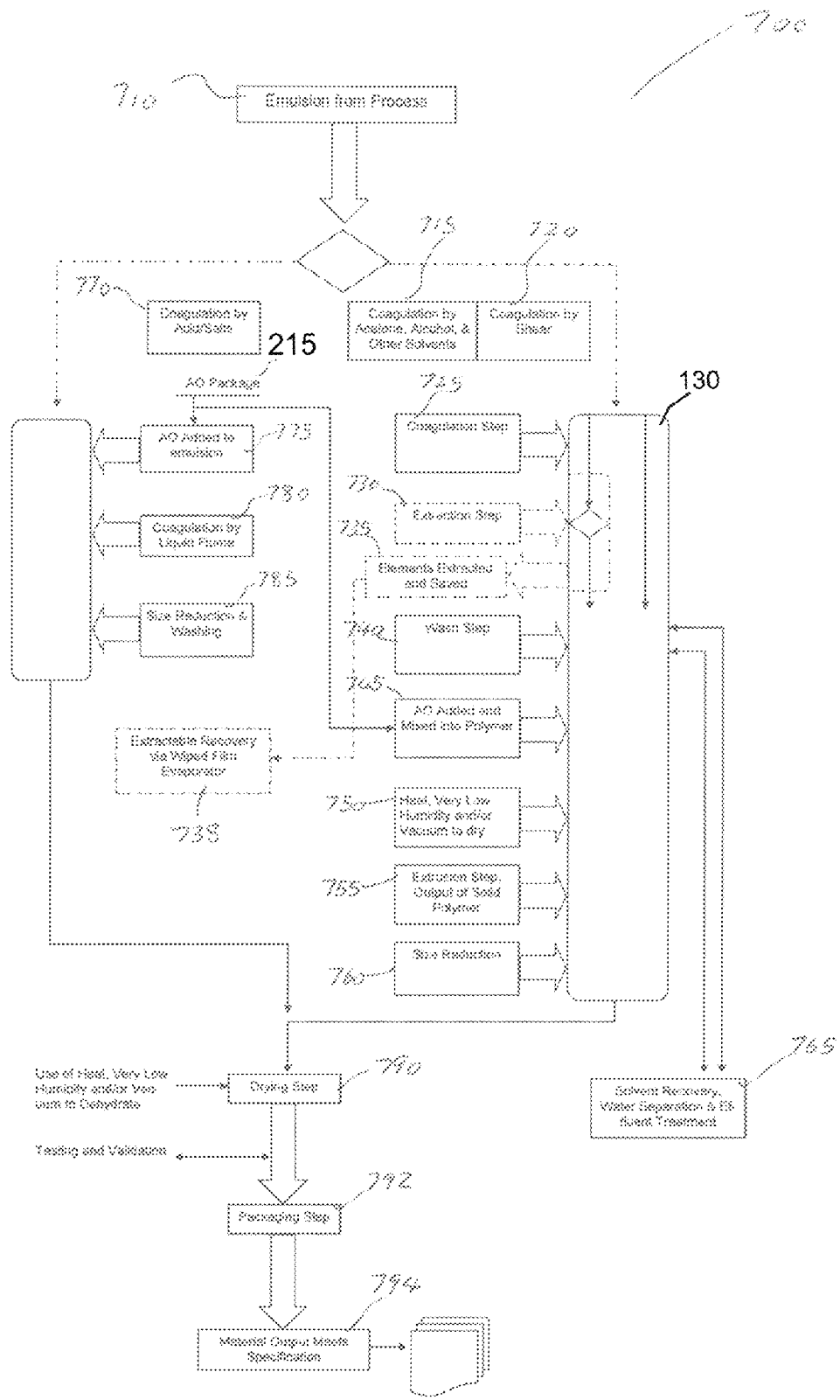
FIG. 5 illustrates methods of processing guayule latex according to one embodiment of the invention.

The introduction of the latex 110 and the coagulant 120 into the extruder 130 can encourage substantial mixing 140 and latex coagulation 150. One of the principle benefits of extrusion technology is the ability to provide a high shear environment as provided by the aforementioned screws 163 which transport fed material 110, 120 along the extruder barrel 165 through one or more heated regions of the barrel (i.e. zones 170). This high shear environment not only has the potential to aid in the coagulation process, but provides an environment to intimately mix various components (i.e., latex 110, coagulant 120, and any by-products) within the extruder 130 to form a homogenous product. Following introduction into the extruder 130, the operation of one or more rotating screws 163 within the extruder 130 can enable substantially mixing 140 of the latex 110 and the coagulant 120 resulting in coagulation 150 of the latex 110 to form a coagulum 155. As described earlier, the extruder 130 can include a first end 166a where latex 110 and coagulant 120 are placed the barrel 165 of the extruder 130, where the barrel comprises one or more zones 170. The plurality of process zones 170 as shown can include at least one mixing zone, and at least one coagulation zone positioned between the first end 166a and the second end 166b. In some embodiments as shown in FIG. 5, coagulation 720 can occur as a result of subjecting the latex to the high shear conditions generally present within a screw extruder (such as the extruder 130 illustrated in FIG. 1B).

Some extruders 130, more particularly those with twin-screws 163, are well suited to mix and provide uniform dispersion of additives in polymeric materials, including natural rubber (often called compounding). A twin screw extruder 130 with non-intermeshing counter-rotating or partially intermeshing counter-rotating screws 163 for example, can provide a positive material displacement from one or more feed hoppers 166c to the extrusion die (i.e., the second end 166b), with high levels of pressure. In some embodiments, continuous compounding within twin-screw extruders 130 with feed-dosing of different additives (liquid or solid) along the extruder barrel 165, offers the ability to control the level of additive mixing, dispersion, and concentration in the final extruded product (e.g., crumb rubber 755).

Latex coagulation 150, in general, refers to the process of at least partial collapse of the latex 110 emulsion, and at least partial formation, aggregation, and/or flocculation of at least some portion of the natural rubber particles that are dispersed to form the latex 110 emulsion. The terms aggregation, flocculation, and coagulation are sometimes used interchangeably in the art. As used herein however, coagulation implies at least some partial collapse of the latex emulsion, at least some coalescence of individual latex particles, and at least the partial formation of aggregates of latex particles (hereinafter termed "coagulum"). The coagulum 155 can comprise a loose or open network, or a compact, substantially solid structure. Depending on the size and mass of the coagulum, the coagulum 155 can be at least partially suspended in a latex serum, or can settle as solid, or a semi-solid mass. In general, the latex serum is comprised principally of water, resin, and other contaminants.

In some embodiments, the latex 110 can be at least partially coagulated using the high shear conditions 720 within an extruder barrel 165 as described earlier. In some further embodiments, the coagulation process can be enhanced by using an added coagulant 120 as described, although in some embodiments, coagulation 150 can occur without the need for addition of coagulant 120. In this instance, the high shear conditions 720 within an extruder barrel alone can be sufficient to induce coagulation 150 of the latex 110.

In some embodiments, the coagulant 120 can comprise a weak acid. For example, in some embodiments, the coagulant 120 can be any one of a formic acid, citric acid, acetic acid or sulfuric acid, or mixtures thereof. In some further embodiments, the coagulant 120 can be a metal salt. For example, in some embodiments, the coagulant 120 can be a calcium salt, such as calcium nitrate. In some other embodiments, other periodic table Group II metal salts can be used, such as for example, barium, magnesium, strontium, and the like. Further, in the various embodiments described throughout, a coagulant 120 can include a single weak acid only, a mixture of weak acids, or a mixture of metal salts, or a mixture of metal salts and weak acid.

Figure 2:
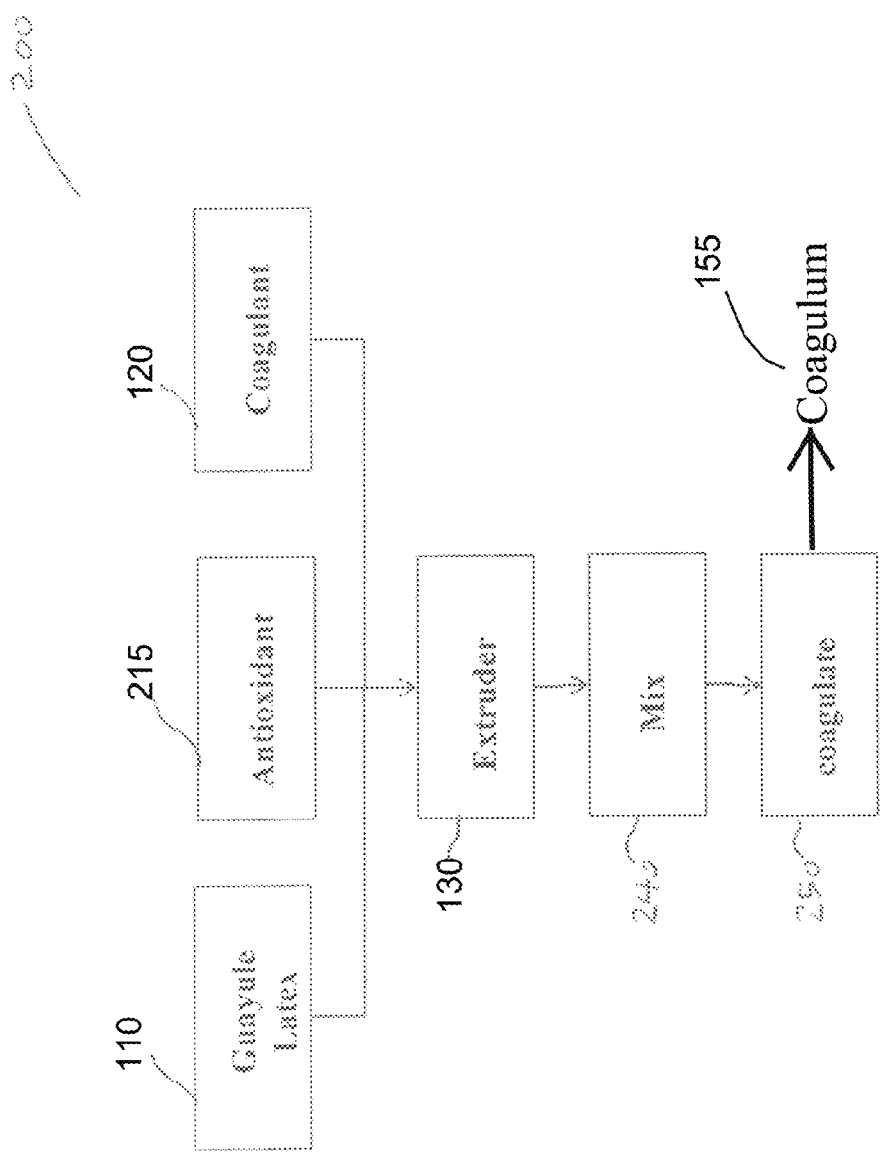
FIG. 2 shows a flowchart illustrating a method of processing guayule latex according to one embodiment of the invention.

Various methods are available to prevent or significantly reduce the formation of degradation products and precursors within natural rubber. One of the more effective methods to prevent or significantly reduce the formation of degradation products and precursors within the natural rubber is to process the latex 110 with one or more stabilizer chemical compounds, including compounds that have significant antioxidant properties. In some embodiments, a stabilizer, such as an antioxidant 215, can be included in the natural rubber derived from the methods of the invention as described (e.g., crumb rubber 755). Natural rubber can be processed at lower temperatures, however lower temperatures can significant extend processing time, especially during the dewatering and drying stages. However to be effective, it is well known in the art that stabilizers, including antioxidants 215, need to be dispersed homogenously within the natural rubber. Inadequate dispersal can lead to areas of natural rubber that contain little, if any antioxidant. During use, or during product storage, oxidative degradation can proceed substantially unhindered within these voids of anti-oxidant-free natural rubber, leading to overall degradation of the chemical and physical properties of the natural rubber Stabilizers are typically used in synthetic and naturally-derived polymers to terminate various molecular reactions caused by exposure oxygen, ozone, heat, and ultra-violet radiation. Stabilizers can be added during one or more polymer processing steps to combat oxidation, cross-linking, chain-scission, etc., to greatly increase the oxidative, thermal, and light/UV stability of the material. For example, as depicted in FIG. 2, showing a flowchart 200 illustrating a method of processing guayule latex 110, in some embodiments, a coagulum 155 derived from the methods of the invention as described can include a stabilizer, such as an antioxidant 215. In this instance, the stabilizer can be an antioxidant 215 that is not naturally-derived from the plant from which the original latex 110 is derived. This does not preclude the coagulum retaining one or more naturally-derived stabilizers, but includes at least one added antioxidant 215 (which can include one or more synthetic or naturally-derived compounds that function as antioxidants at least in the presence of natural rubber).

The process depicted in the flowchart 200 shown in FIG. 2 shows that in some embodiments, an antioxidant 215 can be added to the extruder 130, and processed with the latex 110 and the coagulant 120 by mixing 240 to produce a coagulum 155. Depending on the type of extruder 130, and one or more parameters including, but not limited to the barrel length, screw design, mixing time and temperature, the coagulum 155 can emerge from the extruder 130 with a substantially homogenous distribution of antioxidant 215.

The introduction of one or more stabilizers can occur in one or more steps or stages. For example, as depicted in FIG. 3A showing a flowchart 300 illustrating a method of processing guayule latex 110, in some embodiments, a stabilizer (antioxidant 215) can be added to the coagulant 120 and fed into the extruder 340. Following introduction into the extruder 130 along with a latex 110, the operation of one or more rotating screws within the extruder 340 can enable substantial mixing 350 of the latex 110 with the coagulant 120 comprising antioxidant 215, resulting in coagulation 360 of the latex 110 to form a coagulum 155.

In some other embodiments, the stabilizer (antioxidant 215) can be added to the latex prior to being fed into the extruder. For example, FIG. 3B shows a flowchart 370 illustrating a method of processing guayule latex 110 according to one embodiment of the invention. In this instance, a antioxidant 215 can be added to the latex 110, and fed into the extruder 130. Following introduction into the extruder 130 along with a coagulant 120, the operation of one or more rotating screws within the extruder 130 can enable substantial mixing 384 of the coagulant 120 with the latex 110 comprising antioxidant 215, resulting in coagulation 386 of the latex 110 to form a coagulum 155.

In some further embodiments, the stabilizer (such as antioxidant 215) can be added to both the coagulant 120 and the latex 110 prior to entering the extruder. Alternatively, in some embodiments, the antioxidant 215 can be added to both the coagulant 120 and the latex 110 prior to entering the extruder 130, or while the latex 110 and/or coagulant 120 are being introduced into the extruder 130. Moreover, in some embodiments, a stabilizer (such as antioxidant 215) can be introduced into a zone of the extruder 130 and mixed with the latex 110, the coagulant 120, or both.

In some embodiments, the stabilizer (such as antioxidant 215) can be a solid or a semi-solid material, and can comprise a crystalline, partially crystalline, or amorphous powder. In some other embodiments, the stabilizer can be a liquid, an emulsion, or dispersion. In some embodiments, a stabilizer (such as antioxidant 215) can be at least partially solvated by one or more components of the latex 110 during the residence time within one or more zones of the extruder 130. For example, in some embodiments, at least some fraction of the antioxidant 215 can mix at the molecular level (i.e. be solvated) within a water component of the latex 110 or the resin component of the latex 110, or the natural rubber component of the latex 110. In some other embodiments, at least some fraction of the antioxidant 215 can be at least partially dispersed within the latex 110 to form a sub-nanometer-sized phase within the natural rubber phase of the latex 110. In other embodiments, at least some fraction of the antioxidant 215 can be at least partially dispersed within the latex 110 to form at least nano-sized phases within the natural rubber phase of the latex 110. In other embodiments, at least some fraction of the antioxidant 215 can be at least partially dispersed within the latex 110 to form a sub-micron-sized phases within the natural rubber phase of the latex 110. In other embodiments, at least some fraction of the antioxidant 215 can be at least partially dispersed within the latex to form substantially micron-sized phases within the natural rubber phase of the latex 110. In some other embodiments, at least some fraction of the antioxidant 215 can be at least partially dispersed within the latex to form phases within the natural rubber phases in the latex that are larger than 1 micron.

In some embodiments, the coagulum 155, 155, 155 processed by the methods as described can include at least some fraction of an antioxidant 215 that is mixed at the molecular level with natural rubber and forms a single phase natural rubber and antioxidant 215, and at least some fraction that comprises a second phase comprising substantially antioxidant 215. In some embodiments, the natural rubber can comprise a homopolymer or a substantially miscible polymer blend. In some embodiments, one or more components of a stabilizer (such as the aforementioned antioxidant 215) can form one or more molecular bonds with one or more molecular bonds of at least one component of the coagulant 120. In some other embodiments, one or more components of the antioxidant 215 can form one or more covalent bonds with one or more molecular bonds of at least one component of the natural rubber. In other embodiments, one or more components of the antioxidant 215 can form one or more ionic bonds with one or more molecular bonds of at least one component of the natural rubber. In some other embodiments, one or more components of the antioxidant 215 can form one or more hydrogen bonds with one or more molecular bonds of at least one component of the natural rubber. Some embodiments can include one or more components of the antioxidant 215 at least partially bonded to at least one component of the natural rubber by Van der Waals forces.

Some embodiments include a staining antioxidant 215, but other embodiments can include a substantially non-staining antioxidant 215. In general, antioxidants 215 that are used in rubber are classified as staining if the antioxidant 215 darkens the color of the vulcanizate (cured rubber), and are classified as non-staining if there no substantial darkening. Staining is not generally of a concern for black colored products that can contain a darkening additive, such as carbon-black, but it can be of significance in lighter colored products.

In some embodiments, the antioxidant 215 can be a sterically hindered phenol, and in other embodiments, the antioxidant 215 can be a hydroquinone derivative. In some embodiments, the antioxidant 215 can be a paraphenylene diamine derivative. In some embodiments of the invention, the stabilizer can include more than one antioxidant 215. For example, in some embodiments, the antioxidant 215 can include a mixture of a sterically hindered phenol and a hydroquinone derivative. In some other embodiments, the antioxidant 215 can comprise a mixture of a butylated reaction product of p-cresol and dicyclopentadiene (CAS. Reg. No. 68610-51-5) and an aqueous mixture of 2,5-Di(Tert-Amyl) Hydroquinone (CAS. Reg. No. 79-74-3) and Sodium Salts of Polymerized Alkylnaphthalenesulfonic Acid (CAS. Reg. No. 9084-06-4/36290-04-7). In some other embodiments, the antioxidant 215 can include Octadecyl 3,5-Di(tert)-butyl-4-hydroxyhydrocinnamate) (CAS. Reg. No. 2082-79-3), and in some other embodiments, the antioxidant can be a synergistic blend of polymeric hindered phenol and thioester (dilaurylthiodipropionate) (CAS. Reg. No. 68610-51-5 and CAS. No. 123-28-4. In some further embodiments, the antioxidant can comprise N,N'-di-beta-naphthyl-p-phenylenediamine, 55% casein free dispersion (CAS. Reg. No. 93-46-9). In some further embodiments, the stabilizer can include at least some proportion of an antioxidant 215 comprising a 50% active aqueous dispersion of polymerized 1,2 Dihydro-2,2,4-Trimethylquinoline (CAS. Reg. No. 26780-96-1).

Figure 4A:
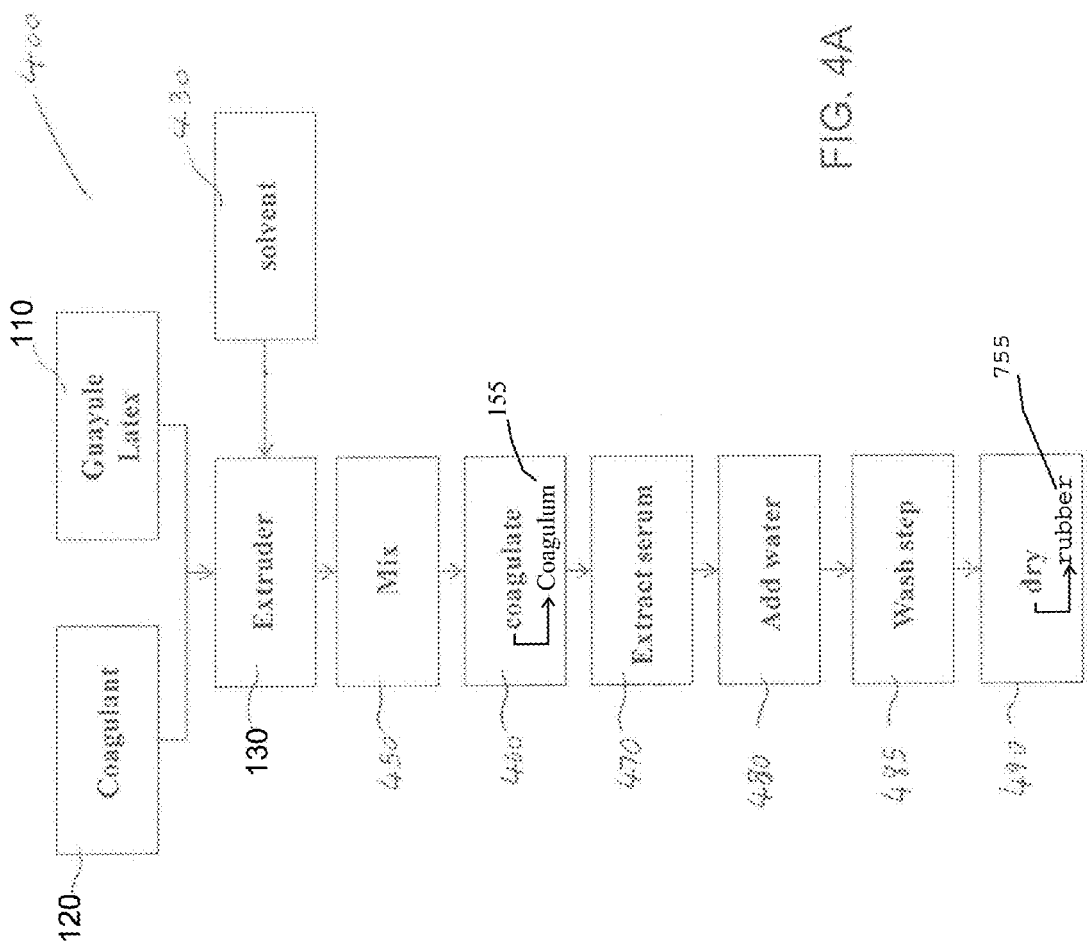
FIG. 4A shows a flowchart illustrating a method of processing guayule latex according to one embodiment of the invention.

FIG. 4A shows a flowchart 400 illustrating a method of processing guayule latex 110 according to one embodiment of the invention. As shown, in some embodiments, guayule-derived latex 110 can be introduced into an extruder 130 with a coagulant 120, and in some embodiments, a solvent 430 can be added. In some embodiments, the solvent 430 can induce or enhance coagulation 460, and aid in preferential solvation of resin and other contaminants 470. Within the method as described and illustrated in flowchart 400, operation of the extruder 130 can, as previously mentioned, develop and encourage significant mixing 450 of the latex 110, coagulant 120, and solvent 430. In some embodiments, the speed of rotation of one or more screws 163 within the extruder 130 can be modified to further enhance mixing and to transport one or more components of the latex 110 through the extruder 130 from one zone to another zone 170. In some other embodiments, the temperature of one or more zones 170 within the extruder 130 can be modified to further enhance blending and mixing. In some embodiments, following a certain residence time, coagulation 460 of at least some fraction of the latex 110 can occur to produce coagulum 155 and serum 470. In fact, the combining of at least some fraction of the guayule latex 110 with at least some fraction of the coagulant 120 within at least one of the plurality of process zones can transform at least some fraction of the guayule latex 110 into a mixture of coagulum 155 and serum 470.

In some embodiments, the serum 470 can be extracted while the coagulum 155 remains within the extruder 130. Some embodiments of the invention provide for a method that includes a solvent 430 recovery step. In some embodiments, at least one solvent (i.e., previously added solvent 430) can be recovered from the serum 470 and reused. In some embodiments, the solvent 430 is recycled using this method and fed back into the extruder 130 in the solvent 430 addition step as shown in FIG. 4A.

The solvent 430 can be any one or mixture of conventional solvents that can comprise a ketone. For example, in some embodiments, a ketone such as acetone, or methyl ethyl ketone, or methyl isobutyl ketone, or a mixture thereof can be used. In some other embodiments of the methods as described, the solvent 430 can use an alcohol-based solvent, such as for example, methanol, or ethanol, or isopropyl alcohol, butanol, isobutanol, an ethoxylated alcohol, or a mixture thereof. In some embodiments, in some embodiments, the solvent 430 can be a solvent blend. Moreover, in some embodiments, the solvent 430 can comprise a mixture or blend forming an azeotrope.

In some embodiments, the operation of the extruder 130 to mix at least some fraction of a solvent 430 with at least some fraction of the coagulum 155 produces at least some deresinated coagulum 155. As shown in FIG. 4A, a solvent 430 can be introduced into the extruder 130, and the solvent 430 can solvate at least some resin contaminant (represented by step 470). In some embodiments, processing of the coagulum 155 with the solvent 430 can occur where at least one of the plurality of process zones 170 is configured and arranged to at least partially deresinate the resin and to extract the solvent 430, and any solvated contaminants, including resin prior to a washing step 485.

As shown in FIG. 4A, in some embodiments, following coagulation 460 and serum extraction 470, the method can include water addition step 480. Performing a wash step (in this instance represented by step 480) within the extruder 130 can include introducing water to at least one of the plurality of process zones 170 of the extruder 130 to at least partially contact the coagulum 155. In some embodiments, operation of the extruder 130 to rotate at least one screw 163 within the barrel of the extruder 130 containing coagulum 155 and water (step 480), serves to intimately mix the water with the coagulum 155. In some embodiments, continual operation of the at least one screw of the extruder 130 while substantially simultaneously extracting water can significantly reduce the water content of the coagulum 155 to produce a dewatered coagulum 155. In some embodiments, the process can also significantly lower the level of water extractable contaminants, and while also reducing at least some acidity from residual latex stabilizer 215 or added coagulant 120, or both.

Figure 4B:
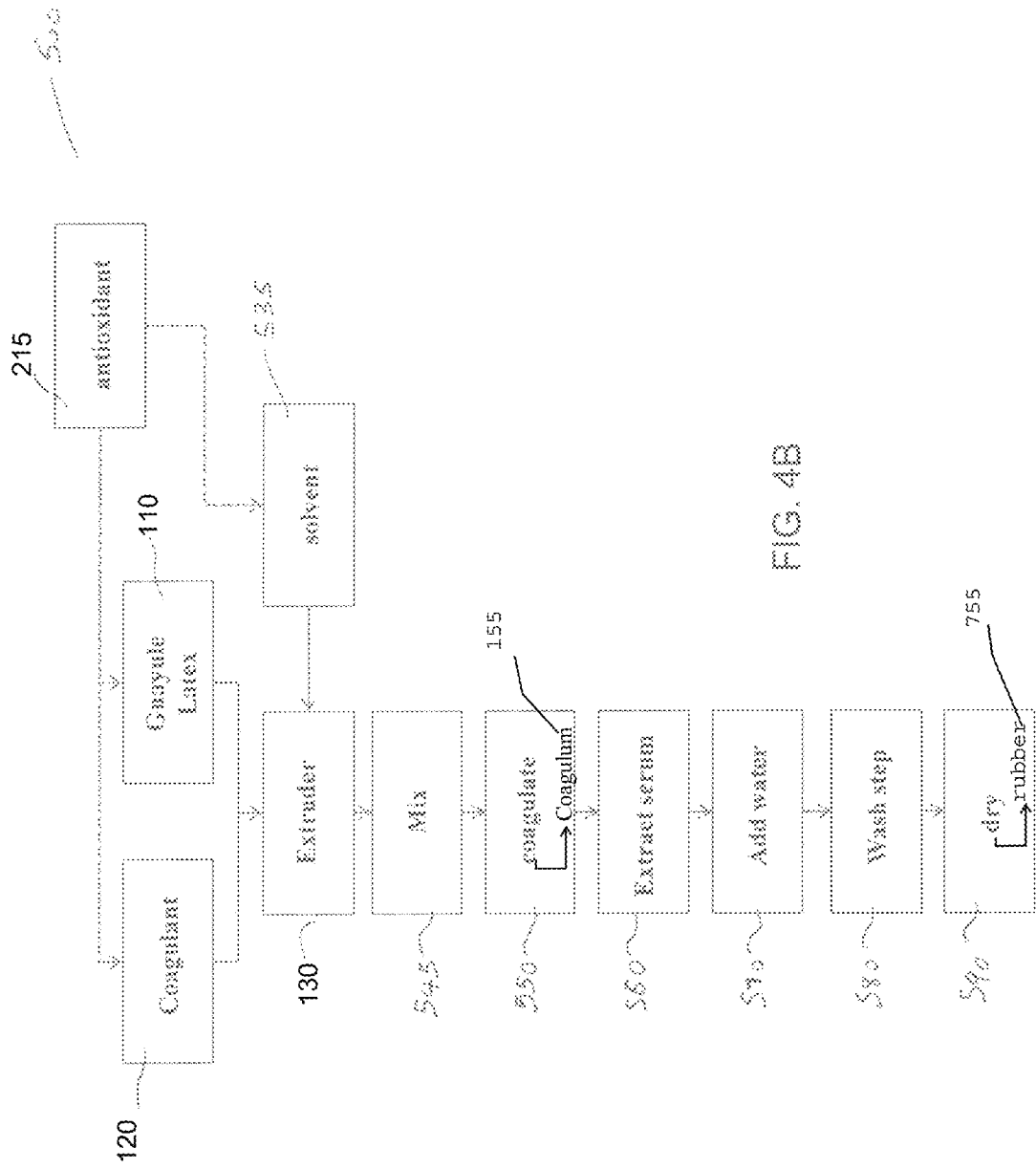
FIG. 4B shows a flowchart illustrating a method of processing guayule latex according to one embodiment of the invention.

The use of extrusion technology as described provides for a variety of processing methods to prepare natural rubber with well-dispersed, homogenous distribution of additives, such as stabilizers (including antioxidants 215) to inhibit aging caused by exposure oxygen, ozone, heat, and ultra-violet radiation. For example, as shown in FIG. 4B, showing a flowchart 500 illustrating a method of processing guayule latex 110 according to one embodiment of the invention, in some embodiments of the method, a stabilizer (such as an antioxidant 215) can be included as an additive into the extruder 130 upon addition of latex 110 to the extruder 130. For example, as depicted in FIG. 4B in flowchart 500, in some embodiments, a coagulum 155 derived from the methods of the invention as described can include a stabilizer, such as an antioxidant 215 added to the coagulant 120, the latex 110, or a solvent 535, which is then added to the extruder 130. In some other embodiments, an antioxidant 215 can be added to the extruder 130, and processed with the latex 110 and the coagulant 120, the latex 110 and the solvent 535, or the coagulant 120 and the solvent 535. In particular, in some embodiments, an antioxidant 215 can be added to one or more zones 170 substantially towards the first end 166a of the extruder 130. In some embodiments, the antioxidant 215 can remain in some fraction in the dried coagulum 155 towards the second end 166b of the extruder 130, after it emerges from the extruder 130 (i.e. as crumb rubber 755), following a mixing step 450, a compounding or kneading step (shown as the coagulation step 460), a serum extraction step 470, a washing step 485 (following a water addition step 480), and a drying step 490.

Figure 4C:
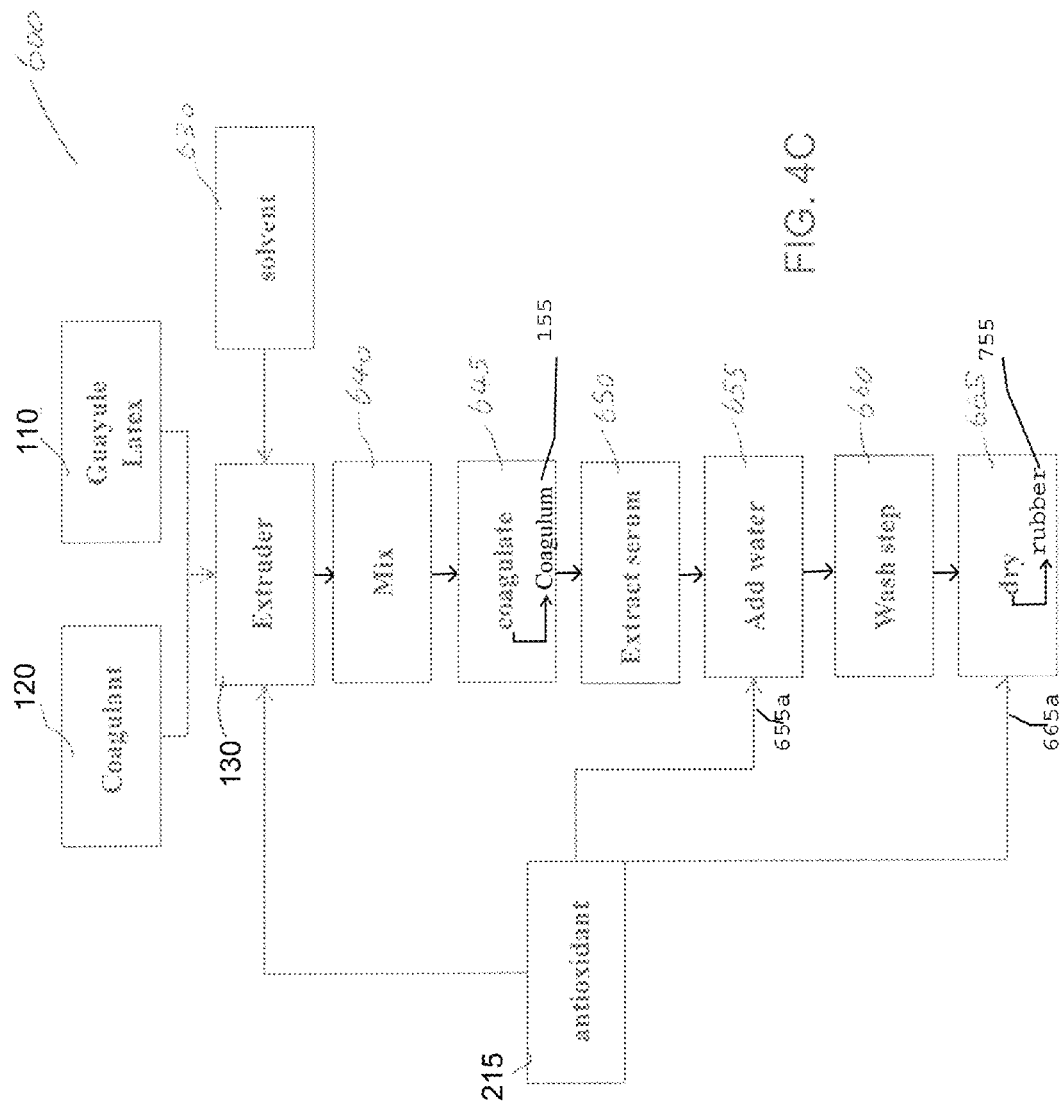
FIG. 4C shows a flowchart illustrating a method of processing guayule latex according to one embodiment of the invention.

FIG. 4C shows a flowchart 600 illustrating a method of processing guayule latex 110 according to another embodiment of the invention. As shown, in some embodiments, a stabilizer, such as an antioxidant 215 can be introduced to the extruder 130 performing the method as described at different zones 170 within the extruder 130. For example, in some embodiments, a coagulant 120, a latex 110, and a solvent 630 can be sequentially, or substantially simultaneously introduced into the extruder 130, and one or more antioxidants 215 can be introduced into the extruder 130 at the same time, within the same zone 170. Alternatively, one or more antioxidants 215 can be added following the coagulate step 645, after the serum extraction step 650, but prior to, or with the addition of water 655, and before commencement of a coagulum washing step 660. As described previously, a washing step 660 can include kneading and intimately mixing of a coagulum 155 with water, and as depicted in FIG. 4C, the washing step 660 can also take place with the presence of a stabilizer, including one or more antioxidants 215 (depicted by arrow 655a). In some embodiments, one or more antioxidants 215 can be at least partially miscible with water. In other embodiments, the one or more antioxidants 215 can be dispersible with water, and in other embodiments, generally insoluble in water. As shown in FIG. 4C, in some further embodiments, a stabilizer, including one or more antioxidants 215 can be introduced into the extruder 130 after a washing step, prior to completion of a drying step (as depicted by the arrow 665a).

One or more of the embodiments as described are further illustrated in FIG. 5, showing a system and method 700 of processing guayule latex 110 in accordance with various embodiments of the invention. Following coagulation, in some embodiments, an extraction step 735 can be optionally implemented to remove one or more components including solvent, and serum as described in some embodiments previously. In some further embodiments, at least some fraction of the coagulum 155 can be optionally extracted and prepared as a solid or semisolid without progressing to further processing within the extruder barrel 165. For example, as depicted, in some embodiments, extracted material can be retrieved following a coagulation event, and a solid film can be prepared using various methods, including, but not limited to a wiped-film evaporator 738. In some embodiments, the process can be continuous where extracted solvent is fed continuously into one or more wiped-film evaporators (e.g., shows as the solvent recovery step 765). In some embodiments, the continuous process can include one or more solvent recovery systems designed to retain recovered solvent for subsequent use in the process or reuse elsewhere. In some other embodiments, the process can include solvent recovery systems designed to retain recovered solvent and separate a residue from the solvent. Further, the process 700 illustrates of various embodiments of processes where latex emulsion 710 can be processed to produce a rubber 755, which can be sized reduced 760, dried 790, and packaged 792 as a rubber material that meets a specification 794. Coagulation can proceed with acids and/or metal salts 770, by acetone, alcohol, and/or with other solvents 715, and/or by using shear 720 (e.g., the high shear provided by the extruder 130 as mentioned earlier), and can proceed by a coagulation step 725, or by coagulation by flume 780 (described below as related to FIG. 6). A stabilizer such as an antioxidant package 215 can be added to the emulsion 775. In some embodiments, the extruder 130 can be used to coagulate 725, and then proceed to an extraction step 730. As described above, elements can be extracted and saved (735), and can proceed to extractable recovery via a wiped film evaporator 738. Some embodiments can then proceed with a wash step 740, following in some embodiments by the addition of an antioxidant package 215 (step 745). In some embodiments, following a drying step 750, crumb rubber 755 can be extruded. Moreover, as depicted in some embodiments, substantially dry coagulum (crumb rubber 755) can be extracted from the extruder 130, and can undergo further processing, including, but not limited to size reduction (e.g. mechanical chopping and cutting). In some other embodiments, the dried coagulum (crumb rubber 755) can be extruded into a mold or die to produce a solid or semisolid material. In some further embodiments, the dried coagulum (crumb rubber 755) can be solvated to produce a substantially liquid natural rubber. In some other embodiments, the liquid natural rubber can be introduced into film-forming device, (e.g. a wiped-film evaporator) to produce a natural rubber film or sheet (shown as step 738). Following size reduction processes 785, 760, processing can continue to a drying step 790 to the material 794 as mentioned earlier, in some embodiments, the wash step 740 can be followed by exposing the coagulum 155 (from step 725) to heat and a vacuum (750) to encourage vigorous drying of the coagulum 155. At this stage, as well potentially in other stages of the extrusion coagulation process, the coagulum 155 can be exposed to transiently high temperatures. These high temperatures can, in some instances, induce some significant degradation of the natural rubber. In some instances the degradation can be initiated and accelerate within the extruder 130 at high temperatures. In other instances, the high temperatures can create a significant concentration of oxidation precursor molecules, setting the stage for accelerated degradation of the natural rubber in later processing steps, or during service life, or storage.

In some further embodiments, steam 430a (shown in FIG. 1B) can be used in the methods described previously and illustrated in FIGS. 1A-1B, 2, 3A-3B, 4A-4C, 5-6 to facilitate the coagulation, drying and removal of contaminants. In some embodiments, pressurized or unpressurized steam 430a can be used to induce coagulation of a latex 110. In some other embodiments, pressurized or unpressurized steam 430a can be used to at least partially remove contaminants from a coagulum from any of the processes illustrated in FIGS. 1A-1B, 2, 3A-3B, 4A-4C, and 5-6. In other embodiments, pressurized or unpressurized steam 430a can be used to at least partially dry a coagulum 155.

Some embodiments of the invention provide alternative method of processing natural rubber latex, such as guayule latex 110. For example, in some embodiments, latex 110 can be processed using a flume process 800 (illustrated in FIG. 6) whereby the latex 110 is coagulated with minimal loss of rubber in the serum in a continuous process. For example, some embodiments provide for a substantially continuous processing of latex 110 to a dried coagulum 155 by moving the latex 110 through multiple spinnerets 860b in an emulsion dispensing bar 860. In some embodiments, the latex 110 is dispensed through one or more spinnerets 860b in the emulsion dispensing bar 860 into a substantially mobile coagulation medium (see FIG. 6). For example, in some embodiments, by moving the latex through the multiple spinnerets 860b into a substantially flowing stream of coagulation medium (e.g., coagulation medium 880 within a flow 810), latex 110 can be coagulated to form a crumb coagulum 155 within the flowing stream of coagulant 880.

In some embodiments, following ejection of the latex 110 through the multiple spinnerets of the bar 860 into a flowing coagulation medium 810, the coagulum 155 can be transported to a size reduction process (e.g., via conveyor 840). For example, in some embodiments, guayule latex 155 can be pumped into the bar 860 through at least one inlet 860a, and into one or more spinnerets 860b to create a dispersed 'waterfall' of latex 110 within a flowing coagulation medium 810. In some embodiments, a pump, such as a conventional peristaltic pump (not shown) can be utilized to move latex 110 from a storage vessel through a delivery tube or pipe to at least one inlet 860a of the emulsion dispensing bar 860. Depending on the speed of the peristaltic pump and the non-Newtonian flow behavior of the latex 110, in some embodiments, the latex 110 can flow at a constant rate, or at an intermittent rate. For example, in some embodiments, a peristaltic pump can operate at a speed to produce a substantially constant rate of ejection of latex 110 from one or more holes in one or more spinnerets 860b of the bar 860. In other embodiments, the flow and/or the rate of ejection can be intermittent, or substantially non-uniform through one or more holes of one or more spinnerets 860b of the bar 860. In some embodiments, latex 110 can be ejected into a flowing stream of coagulant (illustrated as the coagulation flume 810 in FIG. 6). In some embodiments, the rate of flow of the coagulant 810 can be substantially constant. In some other embodiments, the rate of flow of the coagulant 810 can be varied. In some embodiments, the rate of flow of the coagulant 810 can be changed based on the rate of ejection or flow volume of latex 110 entering the coagulum flow 810.

Figure 6:
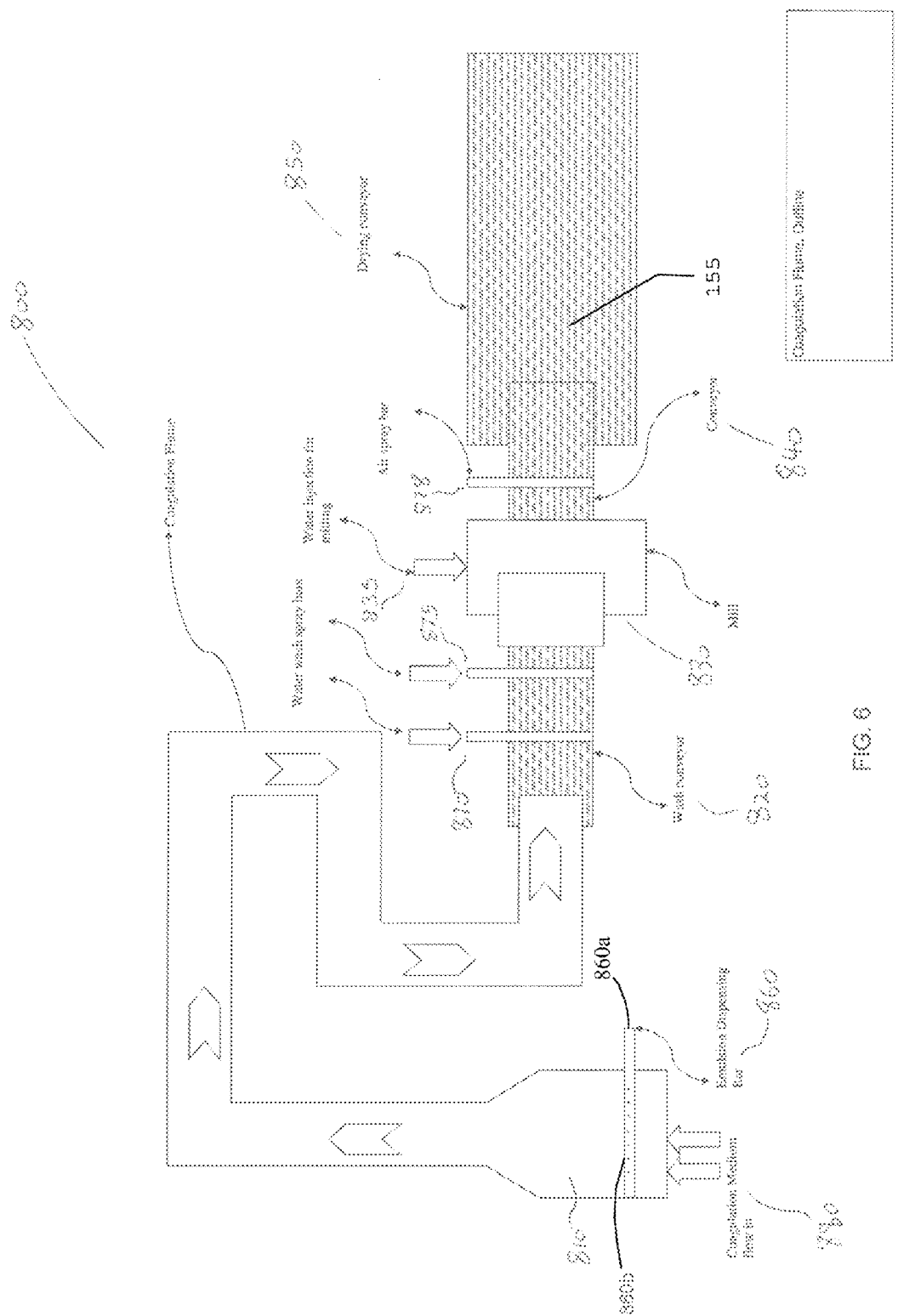
FIG. 6 illustrates methods of processing guayule latex using a flume process according to an alternative embodiment of the invention.

In some embodiments, coagulant flow 810 containing coagulated latex 110 can move onto a wash conveyor 820. As shown in FIG. 6, in some embodiments, the wash conveyor 820 can include water wash spray bars 870, 875. In some embodiments, one or more water wash spray bars 870, 875 can dispense a liquid to substantially wash the coagulated latex 110 on the wash conveyor 840. In some embodiments, the liquid can comprise water.

Some embodiments provide for a size reduction process following coagulation as described above. For example, in some embodiments following a processing of a natural rubber latex 110 (such as guayule latex 110) using the flume process 800 as depicted in FIG. 6, a conventional knife mill 830 or other suitable size-reduction tool can be deployed to reduce the particle size of the coagulum 155 and to increase the surface to volume ratio of the coagulum 155 prior to drying. In some embodiments, as shown in FIG. 6, the mill 835 can include a water injection 835.

Some embodiments of the invention include an air spray bar 878. As illustrated in FIG. 6, in some embodiments, the conveyor 840 can include an air spray bar 878 configured and arranged to dispense a stream of air downwards towards the surface of the conveyor 840. In some embodiments, after exiting the mill 830, at least some coagulum 155 can be at least partially dried by passing through a column of air emitted by the air spray bar 878.

Some embodiments include a drying conveyor 850. As illustrated in FIG. 6, in some embodiments, a drying conveyor 850 can be coupled to the conveyor 840. In some embodiments, after exiting the mill 830, at least some coagulum 155 can be at least partially dried by passing through a column of air emitted by the air spray bar 878, and then passed onto the drying conveyor 850. In some embodiments, after drying the crumb rubber 755 in a hot air oven, the crumb rubber 755 can be baled into a block form.

Using the methods as described throughout and in FIGS. 1A-1B, 2, 3A-3B, 4A-4C, and 5-6, natural rubber (such as crumb rubber 755) extracted from the coagulum 155 can meet or exceed the various physical parameters measured according to various ASTM standards. For example, in some methods of the embodiments of the invention, a substantially dried coagulum (e.g., crumb rubber 755) produced by the methods described and disclosed herein can meet or exceed the various parameters measured according to various ASTM standards. For example, in some embodiments, the Mooney Retention Index can be measured according to ASTM D1646-07. In some embodiments, the Mooney Retention Index can be measured on substantially dried coagulum (755) produced by the methods described and disclosed soon after the material exits one or more of the processes as described herein. In some other embodiments, the aging characteristics of the natural rubber within the coagulum 155 can be measured after the dried coagulum (crumb rubber 755) has undergone accelerated aging. In general, an accelerated aging process can expose the coagulum (crumb rubber 755) to an elevated temperature for periods of time, in specific atmospheric or light conditions, to simulate the effects of a generally longer period of time and general lower temperature (usually ambient and/or expected service-life temperature).

In some embodiments of the invention, substantially dried coagulum (crumb rubber 755) produced by the methods described and disclosed were prepared and aged according to a modified version of the ASTM D3194-04. In some embodiments, the aging temperature used was 143° C. This aging temperature was used in place of the 140° C. aging temperature as taught in ASTM D3194-04. In some embodiments, substantially dried coagulum (crumb rubber 755) produced by the methods described and disclosed, were prepared and aged according to a modified version of the ASTM D3194-04 using the aging temperature of 143° C. As used within the specification, the term heat aged or heat aging refers to performing an accelerated aging at a temperature of 143° C.

Using the methods as described throughout and in FIGS. 1-6, a substantially dried coagulum (crumb rubber 755) can be produced that provides a natural rubber with a Mooney Retention Index of at least 85% after it has undergone thermal aging at 143° C. for 30 minutes as described above. In some other embodiments of the invention, a substantially dried coagulum (crumb rubber 755) can be extracted from an extruder 130, operated using the methods as described to produce a natural rubber with a Mooney retention index of at least 70% after it has undergone thermal aging at 143° C. for 30 minutes measured as described above. In some further embodiments of the invention, a substantially dried coagulum (crumb rubber 755) can be extracted from an extruder 130, operated using the methods as described to produce a natural rubber with a Mooney retention index of at least 60% after it has undergone thermal aging at 143° C. for 30 minutes measured as described above.

FIG. 7A shows a table 900 of typical guayule rubber properties 920 in column 910 according to one embodiment of the invention. For example, the properties 920 can include Mooney viscosity 915a, dirt content (%) 915b, ash content (%) 915c, volatile matter content 915d, and nitrogen (%) 915e. As shown, the Mooney viscosity 915a can be in the range of 65-95, the dirt content 915b can be approximately 0.2%, the ash 915c content can be approximately 0.3%, volatile matter content 915d can be approximately 0.8%, and the nitrogen content 915e can be approximately 0.4%.

FIG. 7B shows a table 950 comprising data for the Mooney retention index 960 after heat aging (%) for Guayule rubber containing antioxidants 955, including 2,5-Di(Tert-Amyl) Hydroquinone (CAS. Reg. No. 79-74-3) (970), sterically hindered phenol (973), a 50/50 blend of 2,5-Di(Tert-Amyl)Hydroquinone (CAS. Reg. No. 79-74-3) (970), sterically hindered phenol (973) (976), a blend of polymeric hindered phenol and thioester (dilaurylthiodipropionate) (CAS. Reg. No. 68610-51-5 and CAS. No. 123-28-4) (979), a 50/50 blend of 2,5-Di(Tert-Amyl)Hydroquinone (CAS. Reg. No. 79-74-3) and (979), a N,N'-di-beta-naphthyl-p-phenylenediamine (985), and Octadecyl 3,5-Di(tert)-butyl-4-hydroxyhydrocinnamate) (CAS. Reg. No. 2082-79-3) (988). The data shown in table 950 represents data from crumb rubber 755 produced by one or more of the processes throughout and illustrated in FIGS. 3A-3B, 4A-4C, 5, (including for example, a rubber material that meets a specification 794), and FIG. 6, and generally shows properties that are superior than those produced by conventional processes. For example, the rubber 755 including 1.5% antioxidant type 970 shows a Mooney retention index after heat aging of 48, and the rubber 755 including antioxidant type 973 at 0.75% shows a Mooney retention index after heat aging of 29. Further, the rubber 755 including 1.5% antioxidant type 976 shows a Mooney retention index after heat aging of 88, and the rubber 755 including antioxidant type 979 at 1.5% shows a Mooney retention index after heat aging of 44. Further, the rubber 755 including 1.5% antioxidant type 982 shows a Mooney retention index after heat aging of 82, and the rubber 755 including antioxidant type 985 at 1.5% shows a Mooney retention index after heat aging of 74, and the rubber 755 including antioxidant type 988 at 1.5% shows a Mooney retention index after heat aging of 88.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A latex processing method comprising:
providing a guayule latex comprising a resin contaminant;
providing at least one coagulant capable of at least partially coagulating the guayule latex;
providing an extruder including a first end and a second end, and at least one screw,
the extruder comprising a plurality of process zones positioned between the first end and second end,
the plurality of process zones including at least one mixing zone and at least one coagulation zone positioned between the first end and the second end; and
combining at least some fraction of the guayule latex with at least some fraction of the at least one coagulant within at least one of the plurality of process zones;
wherein the at least one of the plurality of process zones is configured and arranged to at least partially coagulate at least some fraction of the guayule latex to form a mixture of coagulum and a serum; and
performing a wash step comprising introducing water to at least one of the plurality of process zones to at least partially contact the coagulum;
operating the extruder to at least partially mix the water and the coagulum; and
operating the extruder to remove the water from the coagulum;
providing at least one solvent capable of at least partially dissolving at least some fraction of the coagulum;
introducing the at least one solvent into at least one of the plurality of process zones;
operating the extruder to mix at least some fraction of the at least one solvent with at least some fraction of the coagulum within at least one of the plurality of process zones to produce at least some deresinated coagulum by solvating at least some resin contaminant;
operating the extruder to move at least some fraction of the coagulum from the first end towards the second end and remove at least some fraction of water from the coagulum to form a substantially dewatered coagulum; and
operating the extruder to move at least some fraction of the coagulum into at least one of the plurality of process zones to create substantially dried coagulum.

2. The method of claim 1, wherein the extruder is configured and arranged so that the combining of the at least some fraction of the guayule latex with the at least some fraction of the at least one coagulant, and the formation of coagulum, and the formation of dewatered coagulum, and the formation of dried coagulum can occur substantially simultaneously within the extruder.

3. The method of claim 1, further including mixing at least some fraction of the at least one solvent with at least some fraction of the guayule latex and at least some fraction of the at least one coagulant prior to performing the wash step.

4. The method of claim 1, wherein the extruder is operated to remove the serum from the mixture of coagulum and serum prior to performing the wash step.

5. The method of claim 1, wherein one or more solvents are extracted from the serum.

6. The method of claim 1, wherein the extruder is configured and arranged to at least partially recover the at least one solvent for reuse.

7. The method of claim 1, wherein the at least one coagulant comprises an acid.

8. A method of claim 7, wherein the coagulant further comprises a metal salt.

9. The method of claim 7, wherein the acid includes at least one of citric acid, formic acid, acetic acid, and a sulfuric acid.

10. The method of claim 1, wherein the at least one coagulant comprises a metal salt.

11. The method of claim 1, wherein the at least one solvent comprises a ketone.

12. The method of claim 11, wherein the ketone is at least one of acetone, methyl ethyl ketone, methyl isobutyl ketone, and a mixture thereof.

13. The method of claim 1, wherein the at least one solvent comprises an alcohol.

14. The method of claim 13, wherein the alcohol is at least one of methanol, ethanol, isopropyl alcohol, an ethoxylated alcohol, and a mixture thereof.

15. The method of claim 1, wherein at least one antioxidant is introduced to at least one of the plurality of process zones and the extruder is configured and arranged to form a mixture comprising the at least one antioxidant.

16. The method of claim 15, wherein the at least one antioxidant comprises a substantially non-staining antioxidant.

17. The method of claim 15, wherein the at least one antioxidant is at least one of a sterically hindered phenol, a hydroquinone derivative, a paraphenylene diamine derivative, a mixture of a sterically hindered phenol and a hydroquinone derivative.

18. The method of claim 15, wherein the antioxidant comprises at least one antioxidant selected from a group consisting of a mixture of butylated reaction product of p-cresol and dicyclopentadience (CAS. Reg. No. 68610-51-5) and an aqueous mixture of 2,5-Di(Tert-Amyl)Hydroquinone (CAS. Reg. No. 79-74-3) and Sodium Salts of Polymerized Alkyl-naphthalenesulfonic Acid (CAS. Reg. No. 9084-06-4/36290-04-7), Octadecyl 3,5-Di(tert)-butyl-4-hydroxyhydrocinnamate) (CAS. Reg. No. 2082-79-3), a synergistic blend of polymeric hindered phenol and thioester (dilaurylthiodipropionate) (CAS. Reg. No. 68610-51-5 and CAS. No. 123-28-4, N,N'-di-beta-naphthyl-p-phenylenediamine, 55% casein free dispersion (CAS. No. 93-46-9), and a 50% active aqueous dispersion of polymerized 1,2 Dihydro-2,2,4-Trimethylquinoline (CAS. No. 26780-96-1).

19. The method of claim 15, wherein a dried coagulum extracted from the extruder shows a Mooney retention index of at least about 85% after heat aging at 143° C. for 30 minutes.

20. The method of claim 15, wherein a dried coagulum extracted from the extruder shows a Mooney retention index between at least about 60% and about 85% after heat aging at 143° C. for 30 minutes.

* * * * *